(12) United States Patent
Qi et al.

(10) Patent No.: US 7,988,881 B2
(45) Date of Patent: Aug. 2, 2011

(54) MULTILAYER LAMINATES COMPRISING CHIRAL NEMATIC LIQUID CRYSTALS

(75) Inventors: Kai Qi, Wilmington, DE (US); Lee A. Silverman, Newark, DE (US); Marc B. Goldfinger, West Chester, PA (US); Richard Allen Hayes, Beaumont, TX (US); Jerrel C. Anderson, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 266 days.

(21) Appl. No.: 12/242,211

(22) Filed: Sep. 30, 2008

(65) Prior Publication Data

US 2010/0079721 A1    Apr. 1, 2010

(51) Int. Cl.
| | |
|---|---|
| C09K 19/52 | (2006.01) |
| C09K 19/38 | (2006.01) |
| C09K 19/34 | (2006.01) |
| C09K 19/32 | (2006.01) |
| C09K 19/54 | (2006.01) |
| C09K 19/20 | (2006.01) |
| B32B 9/04 | (2006.01) |
| G02B 5/30 | (2006.01) |

(52) U.S. Cl. .............. 252/299.01; 428/1.1; 428/411.1; 252/299.61; 252/299.62; 252/299.67; 252/299.5

(58) Field of Classification Search ............ 428/1.1, 428/411.1, 426, 500, 522, 523; 252/299.01, 252/299.62, 299.63, 299.67, 299.5; 351/163, 351/165; 359/722, 726
See application file for complete search history.

(56) References Cited

U.S. PATENT DOCUMENTS

| | | | |
|---|---|---|---|
| 3,334,014 A | 8/1967 | Godtfredsen et al. | |
| 3,679,290 A | 7/1972 | Adams et al. | |
| 3,841,890 A | 10/1974 | Coaker et al. | |
| 4,027,073 A | 5/1977 | Clark et al. | |
| 4,144,217 A | 3/1979 | Snelgrove et al. | |
| 4,276,351 A | 6/1981 | Phillips et al. | |
| 4,325,863 A | 4/1982 | Hinsken et al. | |
| 4,335,036 A | 6/1982 | Fowell et al. | |
| 4,338,244 A | 7/1982 | Hinsken et al. | |
| 4,637,896 A | 1/1987 | Shannon et al. | |
| 4,902,464 A | 2/1990 | Cartier et al. | |
| 5,013,779 A | 5/1991 | Fariss et al. | |
| 5,137,954 A | 8/1992 | DasGupta et al. | |
| 5,156,452 A | 10/1992 | Drzaic et al. | |
| 5,175,312 A | 12/1992 | Dubs et al. | |
| 5,190,826 A | 3/1993 | Asahina et al. | |
| 5,216,052 A | 6/1993 | Nesvadba et al. | |
| 5,252,643 A | 10/1993 | Nesvadba et al. | |
| 5,285,299 A | 2/1994 | Drzaic et al. | |
| 5,356,966 A | 10/1994 | Nesvadba et al. | |
| 5,367,008 A | 11/1994 | Nesvadba et al. | |
| 5,369,159 A | 11/1994 | Nesvadba et al. | |
| 5,428,162 A | 6/1995 | Nesvadba et al. | |
| 5,428,177 A | 6/1995 | Nesvadba et al. | |
| 5,488,117 A | 1/1996 | Nesvadba et al. | |
| 5,506,704 A | 4/1996 | Broer et al. | |
| 5,516,920 A | 5/1996 | Nesvadba et al. | |
| 5,607,624 A | 3/1997 | Nesvadba et al. | |
| 5,614,572 A | 3/1997 | Nesvadba et al. | |
| 5,693,829 A | 12/1997 | Nesvadba et al. | |
| 5,731,886 A | 3/1998 | Taber et al. | |
| 5,773,631 A | 6/1998 | Nesvadba et al. | |
| 5,793,456 A | 8/1998 | Broer et al. | |
| 5,814,692 A | 9/1998 | Nesvadba et al. | |
| 5,833,880 A | 11/1998 | Siemensmeyer et al. | |
| 5,940,150 A | 8/1999 | Faris et al. | |
| 6,010,643 A | 1/2000 | Coates et al. | |
| 6,072,549 A | 6/2000 | Faris et al. | |
| 6,140,397 A | 10/2000 | Meier et al. | |
| 6,300,454 B1 | 10/2001 | Hanelt et al. | |
| 6,369,868 B1 | 4/2002 | Fan et al. | |
| 6,410,130 B1 | 6/2002 | Schuhmacher et al. | |
| 6,417,902 B1 | 7/2002 | Greenfield et al. | |
| 6,473,143 B2 | 10/2002 | Li et al. | |
| 6,486,338 B1 | 11/2002 | Hanelt et al. | |
| 6,521,681 B1 | 2/2003 | Zingg et al. | |
| 6,586,606 B2 | 7/2003 | Gerster et al. | |
| 6,630,974 B2 | 10/2003 | Galabova et al. | |
| 6,633,354 B2 | 10/2003 | Li et al. | |
| 6,656,543 B2 | 12/2003 | Schuhmacher et al. | |

(Continued)

FOREIGN PATENT DOCUMENTS

DE    4316611    11/1993

(Continued)

OTHER PUBLICATIONS

CAPLUS 1962: 476164.*
CAPLUS 1977: 113001.*
P. G. De Genes et al., The Physics of Liquid Crystals, 1995, Oxford University Press,(Book Not Included).
E. Hecht, Optics, 1990, pp. 301-303, Wesley Publishing Company, Inc., (Book Not Included).
Broer et al., In-Situ Photopolymerization of Oriented Liquid Crystalline Acrylates 3a, Makromol. Chem., 1989, vol. 190:2255-2268.
Kurihara et al., Preparation of Helical Polyeletrolyte Networks by Polymerization of Hydrogen Bonding Liquid Crystalline Monomers, Macromolecules, 1998, vol. 31:5940.

(Continued)

Primary Examiner — Shean C Wu

(57) ABSTRACT

Provided are multilayer laminates having one or more layers comprising twisted nematic liquid crystals and one or more layers of a polymeric sheet. The twisted nematic liquid crystal layers reflect infrared radiation. Thus, the multilayer laminates are useful to reduce the transmission of infrared energy. For example, in some embodiments the multilayer laminates are useful as windows to reduce energy consumption necessary to cool the interior of a structure such as an automobile or building. Preferably, the multilayer laminates retain one or more of the beneficial properties of safety glass. The multilayer laminates may include additional layers such as infrared absorbing layers, half wave plates, and the like, to minimize the transmission of infrared energy. The multilayer laminates may also include further additional layers such as polymeric films, polymeric sheets, rigid sheets, and the like.

30 Claims, No Drawings

U.S. PATENT DOCUMENTS

| | | |
|---|---|---|
| 6,661,486 B1 | 12/2003 | Faris et al. |
| 6,710,823 B2 | 3/2004 | Faris et al. |
| 6,800,337 B1 | 10/2004 | Siemensmeyer et al. |
| 6,831,720 B2 | 12/2004 | Jiang et al. |
| 7,622,192 B2 | 11/2009 | Hayes |
| 2006/0072151 A1 | 4/2006 | Amani et al. |
| 2007/0116945 A1 | 5/2007 | Goldfinger et al. |
| 2007/0152188 A1* | 7/2007 | Silverman et al. ....... 252/299.01 |
| 2007/0154718 A1 | 7/2007 | Silverman et al. |
| 2007/0228326 A1 | 10/2007 | Goldfinger |
| 2007/0267599 A1 | 11/2007 | Goldfinger |
| 2009/0161061 A1* | 6/2009 | Qi et al. ........................ 349/186 |
| 2010/0079721 A1 | 4/2010 | Qi |

FOREIGN PATENT DOCUMENTS

| | | |
|---|---|---|
| DE | 4316622 | 11/1993 |
| DE | 4316876 | 11/1993 |
| DE | 4408170 | 9/1995 |
| EP | 261712 | 3/1988 |
| EP | 331233 | 9/1989 |
| EP | 397263 | 11/1990 |
| EP | 0589839 | 3/1994 |
| EP | 0591102 | 4/1994 |
| TW | 225090 B1 * | 12/2004 |
| WO | 9628504 | 9/1996 |
| WO | 9847979 | 10/1998 |
| WO | 2009/023759 | 2/2009 |
| WO | 2009/023762 | 2/2009 |

OTHER PUBLICATIONS

Broer et al., In-Situ Photopolymerization of Oriented Liquid Crystalline Acrylates 5a, Makromol. Chem., 1991, vol. 192:59-74.
Hsu et al., Preparationof Liquid Crystals, J. Polym. Sci.: Part A: Polym. Chem., 1999, vol. 37:3929-3935.
Broer et al., In-Situ Photopolymerization of Oriented Liquid Crystalline Acrylates 4a, Makromol. Chem., 1989, vol. 190:3201-3215.
U.S. Appl. No. 12/672,739, filed Aug. 14, 2008, Goldfinger et al.
Mark Goldfinger, U.S. Appl. No. 12/480,022, filed on Jun. 8, 2009.
Mark Goldfinger, U.S. Appl. No. 12/480,003, filed on Jun. 8, 2009.

* cited by examiner

MULTILAYER LAMINATES COMPRISING CHIRAL NEMATIC LIQUID CRYSTALS

FIELD OF THE INVENTION

The present invention relates to glass laminates that provide one or more features associated with safety glass, and that are at least partially opaque to infrared radiation. More particularly, the invention relates to glass laminates comprising a chiral nematic liquid crystal layer that reflects at least a portion of the infrared spectrum.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Glass laminated products have contributed to society for almost a century. Beyond the well known, every day automotive safety glass used in windshields, laminated glass is used as windows for trains, airplanes, ships, and nearly every other mode of transportation. Safety glass is characterized by high impact and penetration resistance and does not scatter glass shards and debris when shattered. These, together with other characteristics set forth below, are among the commonly recognized beneficial properties of safety glass.

Safety glass typically consists of a sandwich of two glass sheets or panels bonded together with an interlayer of a polymeric film or sheet, which is placed between the two glass sheets. One or both of the glass sheets may be replaced with optically clear rigid polymeric sheets, such as sheets of polycarbonate materials. Safety glass has further evolved to include multiple layers of glass and polymeric sheets bonded together with interlayers of polymeric films or sheets.

The interlayer is typically a relatively thick polymer sheet, which exhibits toughness and bonding ability to provide adhesion to the glass in the event of a crack, crash or other physical insult. In general, it is desirable that these polymeric interlayers possess a combination of characteristics including very high optical clarity, low haze, high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, and excellent long term weatherability, among other requirements.

A more recent trend has been the use of glass-laminated products in the construction of homes and office structures. The use of architectural glass has expanded rapidly over the years as designers incorporate more glass surfaces into buildings. Concomitantly, threat resistance has become an ever-increasing requirement for architectural glass laminated products. Thus, some newer products are designed to resist both natural and man-made disasters. Examples of these products include the recent developments of hurricane resistant glass, now mandated in hurricane susceptible areas; theft resistant glazing; and the more recent blast resistant laminated glass products designed to protect buildings and their occupants. Some of these products have great enough strength to resist intrusion even after the glass has been broken, for example, when a glass laminate is subjected to high force winds and impacts of flying debris as occur in a hurricane or where there are repeated impacts on a window by a criminal attempting to break into a vehicle or structure.

Society continues to demand more functionality from laminated glass products beyond the safety and security characteristics described above. One area of need is the reduction of energy consumption within the structure, such as an automobile or building, to which the laminated glass is applied. One approach to energy conservation is to reduce the transmission of radiation that tends to heat the interior of the structure. For example, some of the energy otherwise needed to air-condition a building may be conserved, if the temperature of the interior remains cooler because less solar radiation reaches the interior.

The sun's energy strikes the earth over a wide spectral range from 350 nm to 2,100 nm in wavelength. Nearly half of the sun's energy is within the near infrared region of the spectrum, 780 nm to 2,100 nm. Removing the energy from the visible region (380 nm to 780 nm) would sacrifice visual transparency through windows and, therefore, detract from one of the advantages of windows. However, since the human eye does not sense the near infrared region, attempts have been made to prevent the transmission of the energy from the near infrared region through glass laminates by modifying the glass and/or the polymeric interlayer, by the addition of further layers or by combinations of these approaches.

Liquid crystals are known to appear in many different forms, including the smectic, nematic and twisted nematic (or cholesteric or chiral nematic) forms. A comprehensive description of the structure of liquid crystals in general, and twisted nematic liquid crystals in particular is given in "The Physics of Liquid Crystals," P. G. de Gennes and J. Prost, Oxford University Press, 1995. Twisted nematic liquid crystalline materials are also disclosed in, for example; U.S. Pat. Nos. 3,679,290; 4,637,896; 6,300,454; 6,417,902; 6,486,338 and references disclosed therein. The presence of a chiral moiety within the liquid crystalline material induces the existence of twisted nematic phases. The chiral moiety can either be present in the liquid-crystalline molecule itself or can be added as a dopant to a nematic phase, thereby inducing the twisted nematic mesophase.

Liquid crystalline materials have been considered for use in glazings to control solar radiation. Devices that incorporate micellar liquid crystal materials (discrete particles of liquid crystal materials), within matrix materials generally exhibit haze at unacceptable levels for a transparent glazing. Continuous coatings and films of liquid crystalline materials (nonmicellar liquid crystalline materials), have been disclosed in U.S. Pat. Nos. 3,679,290; 5,731,886; 5,506,704; 5,793,456;; 6,831,720; 6,630,974; 6,661,486; 6,710,823; 6,656,543; and 6,800,337. Liquid crystalline materials have also been used in window glazing units, as described in U.S. Pat. Nos. 5,156,452; 5,285,299; 5,940,150; 6,072,549; 6,369,868; 6,473,143; and 6,633,354, for example.

It is desirable to have a low-haze glazing unit that is effective in reducing the transmission of light, particularly light having wavelengths longer than those in the visible region, and that is also an effective safety glass unit.

SUMMARY OF THE INVENTION

Accordingly, described herein are multilayer laminate articles that reduce the energy requirements of the structure or article in which they are used or to which they are applied by reflecting undesired infrared radiation. The laminates described herein are particularly suitable for use in safety glass in automobile and construction applications, as well as in other applications.

In particular, described herein is a multilayer laminate article for reflecting radiation, preferably infrared radiation having a wavelength in the range of 280 to 2500 nm, more preferably infrared radiation having a wavelength in the range of 650 to 2100 nm, comprising:
(a) at least one layer of a nonmicellar chiral nematic liquid crystal having cholesteric infrared-reflecting properties; and
(b) at least one layer of a polymeric sheet.

Optionally, at least one layer of the nonmicellar twisted nematic liquid crystal is in contact with at least one layer of the said polymer sheet.

The nonmicellar chiral nematic liquid crystal layer comprises a compound of formula (I):

$$D\text{-}S_1\text{—}(B\text{—}S_2)_m\text{-}(A_1S_3)_n\text{—}R_p \qquad (I)$$

wherein

D is a chiral moiety (D1) or (D2) derived, by formal removal of a hydroxyl group, from the alkaloids selected from the group consisting of (−) cinchonidine, CAS [485-71-2]; (+)-cinchonine, CAS [118-10-5]; quinine, CAS [130-95-0] and quinidine, CAS [56-54-2]; and their dihydro-derivatives:

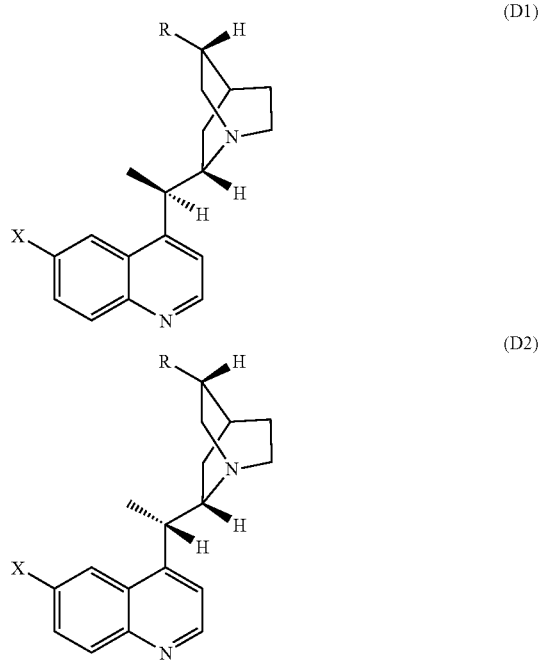

X is hydrogen or —OCH$_3$;
R is —CH=CH$_2$ or —CH$_2$CH$_3$;
S$_1$ is a linking group selected from the group consisting of —O—, —OC(O)—, —OC(O)NH— and —OC(O)O—;
S$_2$ and S$_3$ are linking groups each independently selected from the group consisting of covalent bond, —O—, —S—, —C(O)—, —OC(O)—, —C(O)O—, —OC(O)O—, —OC(O)NR$_1$—, —NR$_1$C(O)O—, —SC(O)—, and —C(O)S—;
R$_1$ is hydrogen or C$_1$ to C$_4$ alkyl;
each B is a divalent radical independently selected from the group consisting of aliphatic and aromatic carbocyclic and heterocyclic groups having 1 to 16 carbon atoms; optionally having one or more fused rings and optionally mono- or polysubstituted with L;
L is selected from the group consisting of the substituents F, Cl, —CN, and —NO$_2$; and alkyl, alkoxy, alkylcarbonyl, and alkoxycarbonyl groups, having 1 to 8 carbon atoms, wherein one or more of the carbon atoms are optionally substituted with F or Cl;
A$_1$ is a divalent linear or branched alkyl having 2 to 20 carbon atoms, optionally interrupted by linking groups selected from the group —O—, —S—, —C(O)—, —OC(O)— and —C(O)O—;
R$_p$ is a polymerizable group;
m is an integer of 1 or 2; and
n is an integer of 0 or 1.

DETAILED DESCRIPTION OF THE INVENTION

Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the invention, suitable methods and materials are described herein.

The following definitions apply to the terms as used throughout this specification, unless otherwise limited in specific instances.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format." Optional additives as defined herein, at levels that are appropriate for such additives, and minor impurities are not excluded from a composition by the term "consisting essentially of", however.

Where an invention or a subcombination thereof is described with an open-ended transitional phrase such as "comprising," unless otherwise stated in specific instances, the term should be interpreted to include a description of the invention or subcombination using the transitional phrases "consisting essentially of" and "consisting of". Likewise, unless otherwise stated, an invention or subcombination described using the transitional phrase "consisting essentially of" also includes a description of the invention or subcombination using the transitional phrase "consisting of".

The indefinite articles "a" and "an" are employed to describe elements and components of the invention. The use of these articles means that one or at least one of the elements or components so modified is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The materials, methods, and examples herein are illustrative only and, except as specifically stated, are not intended to be limiting.

The terms "twisted nematic", "cholesteric" and "chiral nematic" are synonymous and are used interchangeably herein.

The term "(meth)acrylic", as used herein, alone or in combined form, such as "(meth)acrylate", refers to acrylic and/or methacrylic, for example, acrylic acid and/or methacrylic acid, or alkyl acrylate and/or alkyl methacrylate. Moreover, the terms (meth)acrylate salt, (meth)acrylate ester, (meth) acrylate acid, and the like, herein encompass materials and moieties comprising the radical $CH_2=C(R_2)-C(O)-O-$; including methacrylate, wherein $R_2$ is methyl; acrylate, wherein $R_2$ is hydrogen; chloroacrylate, wherein $R_2$ is Cl; and fluoroacrylate, wherein $R_2$ is F.

Finally, the terms "sheet" and "film" are synonymous and are used interchangeably herein. In general, however, sheets may have a thickness of about 10 mils (0.25 mm) or greater. More specifically, although sheets and films are distinguished by their different thicknesses, in general the function of a layer in a laminate of the invention is determined by its composition, rather than by its thickness. Thus, a function that can be performed by a sheet of a particular composition may also be performed by a film of the same or similar composition, and vice versa. Those of skill in the art are aware that there may be variations in the efficiency of the performance of a particular function, resulting from changes in a layer's thickness.

The ability of liquid crystalline materials in twisted nematic phases to selectively reflect light in the infrared, visible or ultraviolet region is useful in many applications. When the propagation direction of plane polarized or unpolarized light is along the helical axis of the twisted nematic layer, the wavelength of maximum reflection, $\lambda_0$, is governed by the equation $\lambda_0 = n_a p$, wherein $n_a$ is the average of $n_o$ and $n_e$, and $n_o$ and $n_e$ are the ordinary and extraordinary refractive indices respectively of the twisted nematic phase measured in the propagation direction and p is the pitch of the helix (the distance the helix takes to repeat itself).

Light outside the vicinity of $\lambda_0$ is essentially unaffected by the twisted nematic material. For light with a wavelength in the vicinity of wavelength $\lambda_0$, the twisted nematic phase exhibits selective reflection of the light such that approximately 50% of the light is reflected and approximately 50% of the light is transmitted assuming negligible absorption and ignoring reflection due to refractive index mismatch between the twisted nematic material and the phase to which it is connected, with both the reflected and transmitted beams being substantially circularly polarized.

The bandwidth $\Delta\lambda$ of this reflected wavelength band centered about $\lambda_0$ can be determined by the formula $\Delta\lambda = \lambda_0 \cdot \Delta n / n_a$, where $\Delta n = n_e - n_o$, a manifestation of the inherent birefringence present in liquid crystal materials. The bandwidth is usually measured as the width of the reflection peak at half of the maximum reflected intensity. The pitch p can be tuned effectively by manipulating the amount of chiral dopant, the twisting power of the dopant and the selection of nematic materials. The pitch is sensitive to temperature, unwinding or tightening with a change in temperature, to electric fields, dopants, and other environmental considerations. Thus, in the twisted nematic phase, manipulation of the pitch, and thus the wavelength of maximum reflection, can be accomplished with a wide variety of tools. Furthermore, the bandwidth $\Delta\lambda$ of the reflected wavelength band also can be manipulated as disclosed in U.S. Pat. Nos. 5,506,704 and 5,793,456. For conventional materials, typical bandwidths in the visible region are less than 90 nm.

Depending upon the intrinsic rotatory sense of the helical nature of the twisted nematic substance, i.e., whether it is right-handed or left-handed, the light that is transmitted is either right-hand circularly polarized light (RHCPL) or left-hand circularly polarized light (LHCPL).

Hereinafter, however, in order to conform to popular convention, the twisted nematic liquid crystal substances will be identified by the kind of light that is reflected in the wavelength region around $\lambda_0$. When a cholesteric or twisted nematic layer is said to be right-handed it is meant that it reflects RHCPL and when a layer is said to be left-handed it is meant that it reflects LHCPL. At $\lambda_0$, a right-handed twisted nematic liquid crystal substance transmits LHCPL essentially completely, whereas the same substance reflects RHCPL almost completely. Conversely, at $\lambda_0$ a left-handed film is almost transparent to RHCPL and reflects LHCPL almost completely. It is assumed here that the cholesteric or twisted nematic layer is optimally aligned in a planar orientation. Since plane polarized or unpolarized light contains equal amounts of RHCPL and LHCPL, a twisted nematic liquid crystal film is approximately 50 percent transmitting at $\lambda_0$ for these sources, neglecting reflection due to refractive index mismatch with surrounding phases and still assuming optimal planar alignment.

Twisted nematic liquid crystal layers have a further unique optical property. The circular polarization of the light that is reflected by a mirror is reversed. This same phenomenon does not occur with light reflected by these liquid crystal layers. The sense of the circularly polarization of light reflected from these liquid crystal substances is not reversed, but rather remains the same as it was before it came into contact with the liquid crystal substance. For example, if RHCPL having a wavelength $\lambda_0$ is directed at a right-handed layer for which $\lambda_0 = n_a p$ it is substantially completely reflected and after reflection remains RHCPL. If the same light were to be directed on a mirror, the reflected light would be LHCPL.

In a solar control application, it is preferred that substantially all the light at some wavelengths be reflected. As this preference requires that light of both circular polarizations be reflected, it is not attainable by a solitary layer of a single, neat chiral nematic liquid crystalline material.

One method for reflecting substantially all of the light in the vicinity of $\lambda_0$ is to use a birefringent material in a thickness sufficient to reverse the handedness of the light that is transmitted through one twisted nematic layer, a so-called half-wave plate or film. Half-wave plates are discussed in detail in a book by E. Hecht, entitled "Optics", published by Addison-Wesley Publishing Company, Inc., 1990, on pages 301-303. A preferred method of using a half-wave film is, for example, to use two twisted nematic liquid crystal layers of similar $\lambda_0$ and identical handedness on either side of the half-wave film. In the case that right handed layers with similar $\lambda_0$ are used on both sides of the half-wave film, the first twisted nematic layer reflects RHCPL, the half-wave layer converts the transmitted LHCPL to RHCPL, which is subsequently reflected by the second right handed twisted nematic layer. As the RHCPL reflected from the second twisted nematic layer once again traverses the half-wave layer subsequent to its reflection, it is converted to LHCPL, which is then transmitted by the initial RHCPL film without modification. In this way substantially all of the incident light with a wavelength in the vicinity of $\lambda_0$ will be reflected by the laminate comprised of the two twisted nematic liquid crystal layers and the half-wave layer, with theoretically none being transmitted.

Another method for reflecting substantially all of the light in the vicinity of $\lambda_0$ is to use two twisted nematic liquid crystal layers with similar values of $\lambda_0$, one right handed and one left handed. The light in the region around $\lambda_0$ transmitted by the first layer will be reflected by the second layer so that substantially all of the incident light with a wavelength in the vicinity of $\lambda_0$ will be reflected by the laminate comprised of the two twisted nematic liquid crystal layers.

There are various ways to make a twisted nematic liquid crystal layer with a reflective bandwidth of greater than 100 nm, 120 nm, or 150 nm. Such a layer can be a composite of several sublayers of twisted nematic liquid crystal, each sublayer having a different $\lambda_0$ but with the different values of $\lambda_0$ sufficiently close to result in an extended reflective bandwidth of greater than 100 nm for the composite layer. Another way that a reflective bandwidth of greater than 100 nm can be achieved is by using a twisted nematic liquid crystal layer with a gradient in the pitch, e.g., having a continuously varying pitch.

For some applications it will be advantageous to reflect radiation in the wavelength range of about 650 nm to 780 nm in addition to reflecting radiation in the near infrared region of 780 nm to 2,100 nm. For other applications it will be advantageous to reflect radiation in other parts of the visible spectrum in addition to reflecting radiation in the near infrared. Multiple twisted nematic films are useful for enabling reflections at the shorter wavelengths as well as those longer wavelengths that are of primary interest here.

Compositions used in the twisted nematic liquid crystal layer of the multilayer laminates described herein comprise compounds which, alone or as a mixture, provide the layer with cholesteric infrared-reflecting properties and high transmittance in the visible region of the electromagnetic spectrum. In principle, virtually all known twisted nematic monomers, monomer mixtures, polymers, polymer mixtures or monomer and polymer mixtures can be adjusted in the pitch of their helical superstructure by varying the content and composition of the chiral component in such a way that the reflection maximum lies within the infrared (IR) region of the electromagnetic spectrum.

Preferred compositions for forming the polymer networks useful as the twisted nematic IR-reflecting liquid crystal layer include a compound of formula (I):

$$D-S_1-(B-S_2)_m-(A_1S_3)_n-R_p \quad (I)$$

wherein

D is a chiral moiety (D1) or (D2) derived, by formal removal of a hydroxyl group, from the alkaloids selected from the group consisting of (−) cinchonidine, CAS [485-71-2]; (+)-cinchonine, CAS [118-10-5]; quinine, CAS [130-95-0] and quinidine, CAS [56-54-2]; and their dihydro-derivatives:

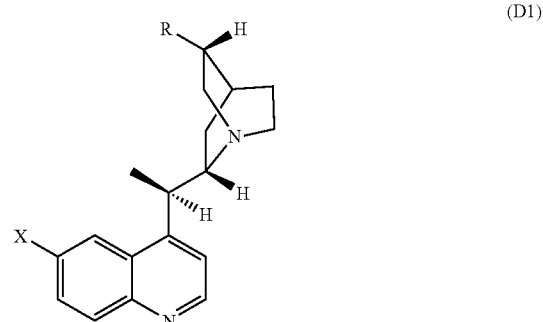

(D1)

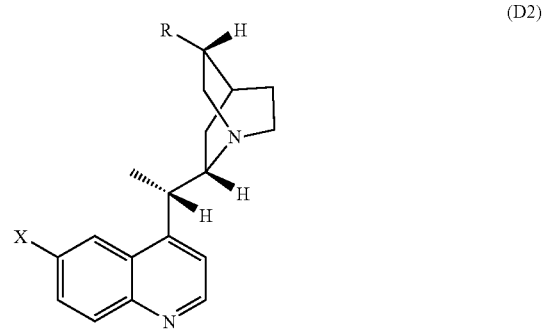

(D2)

X is hydrogen or —OCH$_3$;
R is —CH═CH$_2$ or —CH$_2$CH$_3$;
S$_1$ is a linking group selected from the group consisting of —O—, —OC(O)—, —OC(O)NH— and —OC(O)O—;

S₂ and S₃ are linking groups each independently selected from the group consisting of covalent bond, —O—, —S—, —C(O)—, —OC(O)—, —C(O)O—, —OC(O)O—, —OC(O)NR₁—, —NR₁C(O)O—, —SC(O)—, and —C(O)S—;

R₁ is hydrogen or C₁ to C₄ alkyl;

each B is a divalent radical independently selected from the group consisting of aliphatic and aromatic carbocyclic and heterocyclic groups having 1 to 16 carbon atoms; optionally having one or more fused rings and optionally mono- or polysubstituted with L;

L is selected from the group consisting of the substituents F, Cl, —CN, and —NO₂; and alkyl, alkoxy, alkylcarbonyl, and alkoxycarbonyl groups, having 1 to 8 carbon atoms, wherein one or more of the carbon atoms are optionally substituted with F or Cl;

A₁ is a divalent linear or branched alkyl having 2 to 20 carbon atoms, optionally interrupted by linking groups selected from the group —O—, —S—, —C(O)—, —OC(O)— and —C(O)O—;

R_p is a polymerizable group;

m is an integer of 1 or 2; and n is an integer of 0 or 1.

In formula (I) the left side of the formula listed for S₁ is connected to the chiral moiety (Ia) or (Ib). In a preferred embodiment S₁ is —OC(O)—.

The term "optionally interrupted by linking groups selected from the group —O—, —S—, —C(O)—, —OC(O)— or —C(O)O—" means that A₁ includes alkyl radicals that have one or more of said linking groups, and if present, preferably have 1 to 3 said linking groups; provided that only one linking group, including linking groups S₂ and S₃, is bonded to any one alkyl carbon atom, and there are no linking groups bonded to each other. Examples of a suitable A₁ divalent radical that contain one or more linking groups are polyoxyalkylene chains, of the formula —(CH₂CH₂O)_t CH₂CH₂— wherein t is an integer of 1 to 9.

In one embodiment —R_p is selected from the group consisting of CH₂=C(R₂)—, glycidyl ether, propenyl ether, oxetane, and 1,2-, 1,3-, and 1,4-substituted styryl and alkyl substituted styryl radicals, wherein R₂ is hydrogen, Cl, F, CN, or CH₃. Preferably —R_p is CH₂=C(R₂)—, and R₂ is hydrogen or CH₃. A preferred embodiment is wherein n=0, the radical —S₂—R_p is CH₂=C(R₂)—C(O)—O—, and R₂ is hydrogen or —CH₃. Another preferred embodiment is wherein n=1, the radical —S₃—R_p is CH₂=C(R₂)—C(O)—O—, and R₂ is hydrogen or —CH₃. Another preferred embodiment is wherein S₁ is —O— or —OC(O)—. Another preferred embodiment is wherein S₁ and S₂ are —OC(O)—. In another preferred embodiment, when S₂ is a linking group —OC(O)— or —SC(O)—, A₁ is a linear chain having 3 to 20 carbon atoms.

The term "each B is a divalent radical independently selected from the group" means that when m=2, the two B units are selected independently, that is they may be the same or different. Preferably B is selected from the group consisting of:

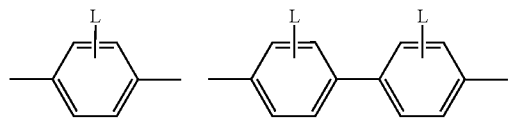

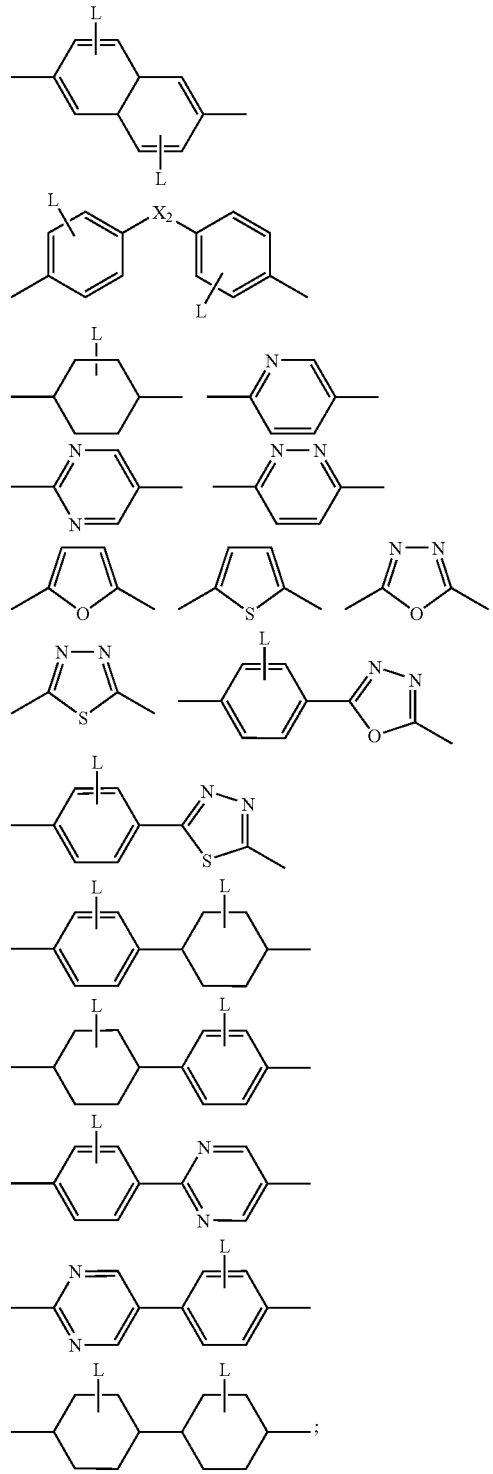

wherein X₂ is a divalent radical selected from the group: —O—, —(CH₃)₂C—, and —(CF₃)₂C—; and L is as defined above.

In some preferred compounds, each B is independently a divalent radical selected from the group consisting of 1,4-cyclohexyl; 2,6-naphthyl; 4,4'-biphenyl; and R₁₁-substituted-1,4-phenyl, wherein R₁₁ is H, —CH₃ or —OCH₃. The term "R₁₁-substituted-1,4-phenyl" refers to the radical

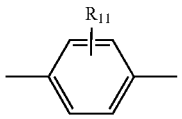

wherein $R_{11}$ can be bonded to any one of the four available carbon atoms. An especially preferred embodiment is wherein each B is independently the divalent radical $R_{11}$-substituted-1,4-phenyl.

In another preferred class of compounds, referring to formula (I), $S_1$ and $S_2$ are each —OC(O)—; m is an integer of 1; B is 2,6-naphthyl or $R_{11}$-substituted-1,4-phenyl; and —$R_p$ is $CH_2$=$C(R_2)$—. Compounds of this preferred group are selected from the group consisting of formulas (IIa), (IIb), (IIc) and (IId):

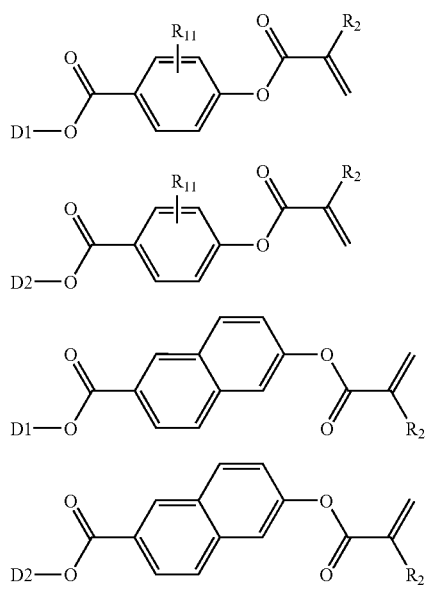

wherein D1, D2, $R_{11}$, and $R_2$ are as defined above.

In another preferred class of compounds, referring to formula (I), $S_1$ and $S_2$ are each —OC(O)—; m is an integer of 1; B is 4,4'-biphenyl; and —$R_p$ is $CH_2$=$C(R_2)$—. Compounds of this preferred class are represented by formula is formula (IIIa) and (IIIb):

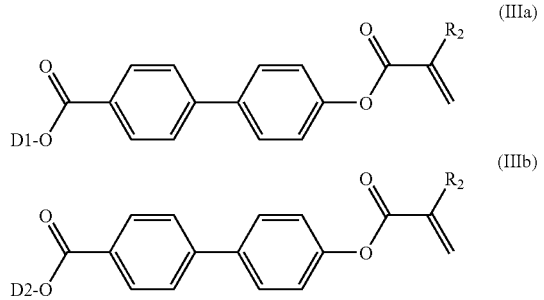

wherein D1, D2, and $R_2$ are as defined above.

In another preferred class of compounds, referring to formula (I), $S_1$ $S_2$ and $S_3$ are each —OC(O)—; m is an integer of 2; each B is $R_{11}$-substituted-1,4-phenyl; and —$R_p$ is $CH_2$=$C(R_2)$—. Compounds of this preferred class are represented by formula (IVa) and (IVb):

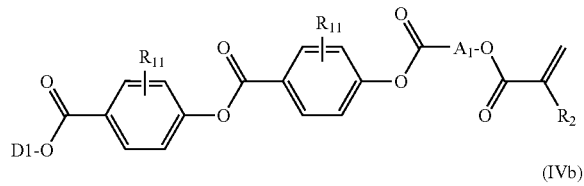

wherein D1, D2, $R_{11}$, $R_2$, and $A_1$ are as defined above.

Compounds of formula (I) are useful as chiral dopants, to induce chirality of a nematic phase to provide a twisted nematic phase, and in preparing polymer networks that exhibit the fixed optical properties of twisted nematic polymer networks. Useful twisted nematic phases can be provided by mixing the chiral dopants at about 0.5 to about 30 wt % based on the total weight of a nematic mixture that may be polymerizable or nonpolymerizable.

A wide variety of polymerizable and nonpolymerizable liquid crystals can be used in polymerizable liquid crystal compositions, including in those described in Makromol. Chem. 190, 2255-2268 (1989), Macromolecules, 1988, 31, 5940, Makromol. Chem. 192, 59-74 (1991), J. Polym. Sci.: Part A: Polym. Chem., Vol. 37, 3929-3935 (1999), and Makromol. Chem. 190, 3201-3215 (1989). Additional polymerizable monomers useful in liquid crystal compositions are described in U.S. Pat. No. 5,833,880, and foreign patent documents DE 4408170, EP 261712, EP 331233 B1, EP 397263 B1, and WO1998047979. Preferred polymerizable liquid crystal compositions of the invention exhibit a twisted nematic phase below 120° C.

A twisted nematic polymer network includes one or more polymerized layer(s) comprising a liquid crystal composition such as, without limitation, polymerized films, coatings, castings and prints; including layers that are patterned or unpatterned and layers having variable or nonvariable optical properties. Preferred are polymer networks comprising a compound of formula (I) and having a wavelength of maximum reflection in the range of about 280 to about 2500 nm; and more preferably, in the range of about 700 to about 1400 nm.

The polymer networks can be can be made by a wide variety of methods, such as those described in U.S. Pat. Nos. 4,637,896; 6,010,643 and 6,410,130. In particular, one preferred method for making a polymer network comprises: providing a polymerizable twisted nematic mixture, in the form of a twisted nematic or isotropic phase, with a polymerization initiator, preferably a radical initiator; applying the twisted nematic mixture to one or more substrates, optionally the substrate(s) comprises an alignment layer, to provide a layer of the twisted nematic mixture; optionally treating the layer to provide a desired twisted nematic phase; and polymerizing the twisted nematic phase, preferably by exposing the twisted nematic phase to actinic radiation.

As a substrate, for example, a glass or quartz sheet, as well as a plastic film or sheet can be used. It is also possible to put a second substrate on top of the coated mixture prior to, during or after polymerization. The substrates can optionally be removed after polymerization. When using two substrates in the case of curing by actinic radiation, preferably at least one substrate is transparent to the polymerizing radiation.

Isotropic or birefringent substrates can be used. In case the substrate is not removed from the polymerized film after polymerization, preferably isotropic substrates are used.

Preferably at least one substrate is a plastic substrate, for example, a film of polyester such as polyethylene terephthalate (PET), polyvinylalcohol (PVA), polycarbonate (PC) or triacetylcellulose (TAC), more preferably a PET film or a TAC film. As a birefringent substrate, for example, a uniaxially stretched plastic film can be used. Preferably, the plastic substrate is buffed, as described in detail below, to enhance the alignment of the chiral nematic phase.

Processes for making the compounds of formula (I) and examples of compounds of formula (I), including preferred examples, as well as procedures for polymerizing liquid crystals and for using the compounds of formula (I) as chiral dopants, and in the preparation of twisted nematic polymer networks are set forth in detail in U.S. Provisional Application No. 60/955,949, by Marc B. Goldfinger and Kai Qi, filed on Aug. 15, 2007, and in the patents and patent applications cited therein.

Twisted nematic liquid crystal layers and/or compositions can be coated, adhered, or applied in any conventional manner, or in a non-conventional manner, that conforms to the purposes and design of the invention described herein. Suitable conventional methods for applying twisted nematic liquid crystal compositions to a substrate include, without limitation, lamination and the use of chemical adhesive agents. In addition, the twisted nematic IR-reflecting liquid crystal layer can be applied directly to a polymeric sheet, a polymeric film, a glass substrate or another rigid substrate by customary or novel techniques. Examples of customary techniques include, but are not limited to, extrusion or co-extrusion; air knife coating; bar coating; squeeze coating; impregnating; reverse roll coating; transfer roll coating; gravure coating; kiss coating; casting; spraying; spin coating; or printing techniques such as letterpress, flexographic, intaglio, transfer printing, offset or screen printing.

In other embodiments, a twisted nematic liquid crystal composition can be formed into a film and applied to the polymer sheet serving as an interlayer.

The twisted nematic layer can be applied in the form of a low-viscosity or high-viscosity mixture to a substrate, but preferably as a low-viscosity mixture. To this end the cholesteric mixtures can be applied to the substrate in undiluted or minimally diluted form at an elevated temperature or in a more diluted form at a low temperature.

The twisted nematic layer(s) can be cured thermally, photochemically or by a beam of electrons. Curing will preferably take place while the material is in the cholesteric phase and with retention of the cholesteric phase. For photochemical polymerization, the cholesteric mixture may include customary commercial photoinitiators. For curing by electron beam, such initiators are not required.

Where two or more layers are applied, they can in each case be applied, dried, if desired, and cured individually. However, it is likewise possible to apply two or more, or all, of the layers to be applied in one application procedure, wet-on-wet, to the article that is to be coated, to carry out conjoint drying if desired and then to carry out conjoint curing. Casting techniques are particularly suitable for the simultaneous application of cholesteric layers, especially knife or bar casting techniques, cast-film extrusion or stripper casting techniques, and the cascade casting process.

The twisted nematic liquid crystal mixtures and formulations can be diluted with any suitable polymerizable or non-polymerizable diluent prior to their application to the substrate. Examples of suitable polymerizable diluents include, for example, 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate, tetraethylene glycol dimethacrylate, pentaerythritol tetraacrylate and ethoxylated pentaerythritol tetraacrylate. The amount of diluent should be kept sufficiently low so that the chirality of the twisted nematic phase remains intact.

In order to adjust the viscosity and the leveling behavior, it is possible for the cholesteric liquid crystal mixtures to be mixed with additional components. For example, it is possible to employ polymeric binders and/or monomeric compounds which can be converted into a polymeric binder by polymerization. Examples of suitable compounds are organic-solvent soluble polyesters, cellulose esters, polyurethanes and silicones, including polyether- or polyester-modified silicones. It is particularly preferred to employ cellulose esters such as cellulose acetobutyrate. However, if polymeric binders and/or monomeric compounds are included in the compositions useful in the present invention, it is desired to maintain the nonmicellar structure of the twisted nematic liquid crystal layer to preserve laminate clarity and low haze.

The addition of small amounts of suitable leveling agents may also be advantageous. It is possible to employ from about 0.005 to 1% by weight, in particular from 0.01 to 0.5% by weight, based on the amount of cholesteric liquid crystal in the mixture. Examples of suitable leveling agents are glycols, silicone oils and, in particular, acrylate polymers, such as the acrylate copolymers obtainable under the name Byk 361 or Byk 358 from Byk-Chemie USA of Wallingford, Conn., and the modified, silicone-free acrylate polymers obtainable under the name Tego Flow ZFS 460 from the Tego brand of Degussa AG through Degussa Goldschmidt of Hopewell, Va.

The cholesteric mixture may also include stabilizers to counter the effects of UV and weather. Examples of suitable additives are derivatives of 2,4-dihydroxybenzophenone, derivatives of 2-cyano-3,3-diphenyl acrylate, derivatives of 2,2',4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or, preferably, as mixtures.

Alignment of the nonmicellar chiral nematic liquid crystal containing layer is used to create a uniform planar orientation, and to promote high visible transmittance and low levels of haze. In order to make a twisted nematic liquid crystal layer that is highly reflective, or more preferably essentially fully reflective, of the center wavelength while simultaneously keeping scattered light to a minimum, it is necessary to align the liquid crystal film into a single domain. When preferential alignment is not achieved, a multidomain layer results. Such a multidomain texture is called the focal conic state. The focal conic state is predominately characterized by its highly diffused light scattering appearance caused by an abrupt change of the refractive indices at the boundary between cholesteric domains. This texture has no single optic axis, and therefore scatters in all directions. The focal conic texture is typically milky-white (i.e. white light scattering). If alignment is achieved, a single domain can be produced. These are called homeotropic and planar states of alignment. In the homeotropic state of a nematic liquid crystal, the molecular axis lies perpendicular to the plane of the nematic layer. In the planar state of a twisted nematic material, the axis of this helix is perpendicular to the plane of the twisted nematic layer. Light with a wavelength matching the pitch of the helix is reflected from the surface of the film and therefore the reflected light does not pass through the layer. It is the planar domain structure that is therefore most preferred.

There are several well known ways to achieve planar alignment of the twisted nematic phase. It is possible to induce planar orientation of a liquid crystal material by using a substrate with a surface that has been rubbed directly, i.e. without applying an alignment layer. It is also possible to put the liquid crystal material on a substrate, clear or otherwise, apply a clear substrate to the free surface of the liquid crystal, and slide one substrate relative to the other, providing a small amount of shear to the liquid crystal film. This often induces a planar state of alignment where the helicoidal axis of the structure is substantially perpendicular to the film.

Orientation layers for liquid crystal films can consist of a polymer film that has been mechanically rubbed so that the directors of the liquid crystal molecules align themselves with the rubbing direction. A commonly used polymer is polyimide, which is deposited as the poly(amic-acid). The poly(amic-acid) is then thermally cured, converting the material to the polyimide. The hardness of the polyamide is controlled by the amount of thermal curing. The resulting polyimide layer can be rubbed as above.

It is also possible that directional orientation in a subsequently deposited nematic liquid crystal can be produced using a vapor deposited silica layer on a substrate. The substrate can be a transparent glass on which a thin transparent layer of an electrical conductor such as indium-tin-oxide (ITO) has been previously deposited. The substrate is moved past a magnetron in-line sputtering source during deposition. One or more passes may be required during silica deposition, and the resulting structure has the necessary directionality as long as the substrate moves back and forth along the same direction past the sputtering source. After the deposition of the silica layer, the silica-treated substrate may be contacted with an alcohol at a sufficiently high temperature to react the alcohol with the hydroxyl groups on the surface of the silica layer. The alcohol treatment may be made with the substrate above 100° C., and most typically 120° to 160° C. After the alcohol treatment, the liquid crystal is contacted to the treated surface and the liquid crystal layer to adopt a planar orientation.

Additional methods of aligning twisted nematic liquid crystals are known to those skilled in the art. In addition, using known processes, it is possible to create alignment of twisted nematic liquid crystal layers on substrates ranging from minute individual pieces to continuous films. There are many types of twisted nematic liquid crystalline materials. It is contemplated that any twisted nematic liquid crystal composition that provides IR-reflecting properties and is mechanically and dimensionally stable under process and use conditions can be useful in the laminates described herein.

Suitable polymeric sheets for use in the present invention, including preferred sheets, are described at length in U.S. application Ser. No. 11/441,899 by Silverman et al. and Ser. No. 11/441,906 by Goldfinger et al., both filed on May 26, 2006, now published as U.S. Patent Appln. Publn. Nos. 2007/0154718 and 2007/0116945, respectively, and in the provisional applications to which these applications claim priority.

Briefly, however, suitable polymeric sheets are available commercially. Alternatively, suitable polymeric sheets may be formed by any suitable process, such as extrusion, calendering, solution casting or injection molding. The suitable polymeric sheet is preferably formed by extrusion. Extrusion is particularly preferred for formation of "endless" products, such as films and sheets, which emerge as a continuous length.

The polymeric sheet may have a smooth surface. Preferably, the polymeric sheet to be used as an interlayer within laminates has a roughened surface to effectively allow most of the air to be removed from between the surfaces of the laminate during the lamination process. This may be accomplished, for example, by mechanically embossing the sheet after extrusion, as described above, or by melt fracture during extrusion of the sheet and the like.

Biaxially stretched or oriented polymeric sheets are preferred.

Some preferred polymeric sheets when the polymeric sheets are formed of a material having a modulus of 20,000 psi (138 MPa) or less, or of 10,000 psi (69 MPa) or less.

For example, in a preferred laminate, the polymeric sheet comprises poly(vinyl butyral) having an average molecular weight range of from about 30,000 to about 600,000 Daltons (Da), preferably from about 45,000 to about 300,000 Da, more preferably from about 200,000 to about 300,000 Da, as measured by size exclusion chromatography using low angle laser light scattering. More preferred is a poly(vinyl butyral) material comprising, on a weight basis, about 5 to about 30 percent, preferably about 11 to about 25 percent, and more preferably about 15 to about 22 percent, hydroxyl groups calculated as polyvinyl alcohol (PVOH). Further, a preferred poly(vinyl butyral) material comprises about 0 to about 10 percent, preferably about 0 to about 3 percent residual ester groups, calculated as polyvinyl ester, typically acetate groups, with the balance being butyraldehyde acetal. The poly(vinyl butyral) material may further comprise a minor amount of acetal groups other than butyral, for example, 2-ethyl hexanal, as disclosed in U.S. Pat. No. 5,137,954.

In a preferred laminate, the poly(vinyl butyral) material further comprises a plasticizer. The amount of plasticizer depends on the specific poly(vinyl butyral) resin and the properties desired for the laminate. Various plasticizers which can be used are known in the art, for example, as disclosed in U.S. Pat. Nos. 3,841,890; 4,144,217; 4,276,351; 4,335,036; 4,902,464; and 5,013,779 and PCT publication WO 96/28504. Plasticizers commonly employed are esters of a polybasic acid or a polyhydric alcohol. Preferred plasticizers are triethylene glycol di-(2-ethyl butyrate), triethylene glycol di-2-ethylhexanoate, triethylene glycol di-n-heptanoate, oligoethylene glycol di-2-ethylhexanoate, tetraethylene glycol di-n-heptanoate, dihexyl adipate, dioctyl adipate, mixtures of heptyl and nonyl adipates, dibutyl sebacate, tributoxyethylphosphate, isodecylphenylphosphate, triisopropylphosphite, polymeric plasticizers such as the oil-modified sebacid alkyds, and mixtures of phosphates and adipates, and adipates and alkyl benzyl phthalates. Generally between about 15 to about 80 parts of plasticizer per hundred parts of resin, preferably about 25 to about 45 parts of plasticizer per hundred parts of resin are used. This latter concentration is generally used with poly(vinyl butyral) resins containing 17 to 25 percent vinyl alcohol by weight.

An adhesion control additive, for controlling the adhesive bond between the polymeric sheet a glass rigid layer, may also be utilized. These adhesive control additives are generally alkali metal or alkaline earth metal salts of organic and inorganic acids. Preferably, the adhesive control additives are alkali metal or alkaline earth metal salts of organic carboxylic acids having from 2 to 16 carbon atoms. More preferably, they are magnesium or potassium salts of organic carboxylic acids having from 2 to 16 carbon atoms. The adhesion control additive is typically used in the range of about 0.001 to about 0.5 weight percent based on the total weight of the polymeric sheet composition.

Other additives, including but not limited to antioxidants, ultraviolet absorbers, ultraviolet stabilizers, thermal stabilizers, and colorants, may also be added to the polyvinyl butyral composition. See, for example, U.S. Pat. No. 5,190,826.

Also preferred are polymeric sheets comprising poly(ethylene-co-vinyl acetate) resins. Suitable poly(ethylene-co-vinyl acetate) resins for use as polymeric sheets in the multilayer laminates described herein are commercially available from the Bridgestone Corporation, (10-1, Kyobashi 1-chrome, Chuo-ku, Tokyo 104-8340, Japan), the ExxonMobil Corporation, (5959 Las Colinas Boulevard, Irving, Tex., USA, 75039-2298), and the E. I. du Pont de Nemours and Company (1007 Market Street, Wilmington, Del., USA, 19898) (hereinafter "DuPont").

The poly(ethylene-co-vinyl acetate) resins preferably have a vinyl acetate level between about 10 to about 50 weight percent, more preferably between about 20 to about 40 weight percent, more preferably between about 25 to about 35 weight percent based on the weight of the total resin. Further, the poly(ethylene-co-vinyl acetate) resins may comprise other unsaturated comonomers. Preferably, the other unsaturated comonomers are selected from the group consisting of methyl acrylate, methyl methacrylate, butyl acrylate, butyl methacrylate, glycidyl methacrylate, acrylic acid, methacrylic acid and mixtures thereof. Preferably, the ethylene copolymers incorporate between about 0 and about 50 weight percent, more preferably between about 0 and about 25 weight percent, and more preferably about 0 weight percent of the other unsaturated comonomer, based on the total weight of the composition.

Like the polymeric sheet materials described above, the poly(ethylene-co-vinyl acetate) resins may incorporate additives, such as thermal stabilizers, UV absorbers, UV stabilizers, plasticizers, organic peroxides, adhesion promoters and mixtures thereof. Further, any of the plasticizers described supra may be used with the poly(ethylene-co-vinyl acetate) resins. Examples of preferred plasticizers include, but are not limited to, polybasic acid esters and polyhydric alcohol esters, such as dioctyl phthalate, dihexyladipate, triethylene glycol-di-2-ethylbutylate, butyl sebacate, tetraethylene glycol heptanoate, triethylene glycol dipelargonate and mixtures thereof. Generally, the plasticizer level within the poly(ethylene-co-vinyl acetate) resin composition does not exceed about 5 weight percent based on the weight of the total composition.

Polymeric sheets of poly(ethylene-co-vinyl acetate) resin composition may preferably be cured by light or by including an organic peroxide. Preferably, the organic peroxide has a thermal decomposition temperature of about 70° C. or greater in a half-life of 10 hours. More preferably, the organic peroxide has a thermal decomposition temperature of about 100° C. or greater. Preferably, the organic peroxide level is within the range of from about 0.1 weight percent to about 5 weight percent, based on the total weight of the poly(ethylene-co-vinyl acetate) resin composition.

When the poly(ethylene-co-vinyl acetate) resin is cured by light, it may include a photoinitiator or photosensitizer. Preferably, the level of the photoinitiator is within the range of from about 0.1 weight percent to about 5 weight percent, based on the total weight of the poly(ethylene-co-vinyl acetate) resin composition.

Polymeric sheets comprising poly(ethylene-co-vinyl acetate) resin may further comprise acryloyl(oxy) group containing compounds, methacryloyl(oxy) group containing compounds and/or epoxy group containing compounds. These materials are preferably used at a level of about 50 weight percent or less, more preferably at a level of about 10 percent or less, more preferably at a level from about 0.1 weight percent to about 2 weight percent, based on the total weight of the poly(ethylene-co-vinyl acetate) resin composition.

Polymeric sheets of poly(ethylene-co-vinyl acetate) resin may further comprise a silane coupling agent to enhance the adhesive strengths. These silane coupling agent materials are preferably used at a level of about 5 weight percent or less, and more preferably at a level within the range of from about 0.001 weight percent to about 5 weight percent, based on the total weight of the poly(ethylene-co-vinyl acetate) resin composition.

Alternatively, the polymeric sheets may comprise a polymer with a modulus between 20,000 psi (138 MPa) and 100,000 psi (690 MPa), preferably with a modulus between about 25,000 psi (173 MPa) and about 90,000 psi (621 MPa), and more preferably with a modulus between about 30,000 psi (207 MPa) and about 80,000 psi (552 MPa), as measured by ASTM Method D-638.

The polymeric sheets used in the high strength multilayer laminates preferably comprise ethylene copolymers that incorporate acid functionality. Some suitable ethylene acid copolymers are commercially available from E.I. du Pont de Nemours & Co. of Wilmington, Del. under the SentryGlas® Plus trademark. Moreover, suitable ethylene acid copolymers are described at length in U.S. Pat. No. 3,334,014; and in U.S. patent application Ser. No. 11/263,015, by Paul et al., filed on Oct. 31, 2005, now published as U.S. Patent Appln. Publn. No. 2006/0072151, and in the provisional application to which it claims priority.

In summary, however, the ethylene acid copolymers may incorporate from between about 0.1 weight percent to about 30 weight percent, preferably from about 10 weight percent to about 25 weight percent, and more preferably from about 15 weight percent to about 25 weight percent of copolymerized acrylic acids, based on the total weight of the ethylene acid copolymer. Preferred acrylic acids include, but are not limited to, acrylic acid, methacrylic acid, itaconic acid, maleic acid, maleic anhydride, fumaric acid, monomethyl maleic acid, and mixtures thereof and most preferably are selected from the group consisting of acrylic acid, methacrylic acid, and mixtures thereof.

Ethylene copolymers used in the polymeric sheets may optionally further comprise other unsaturated comonomers such as acrylates and methacrylates. Preferably, the other unsaturated comonomers are selected from the group consisting of methyl acrylate, methyl methacrylate, butyl acrylate, butyl methacrylate, glycidyl methacrylate, vinyl acetate, and mixtures thereof. Preferably, the ethylene copolymers used in the polymeric sheets comprise between about 0 and about 50 weight percent of the other unsaturated comonomer, based on the total weight of the ethylene copolymer composition. The ethylene copolymers preferably incorporate between about 0 and about 25 weight percent of the other unsaturated comonomer and more preferably incorporate between about 0 weight percent and about 10 weight percent of the other unsaturated comonomer.

The acid moieties of the ethylene acid copolymers can be neutralized to a level of from about 0 to about 100 percent, preferably from about 10 to about 90 percent, more preferably about 20 to about 80 percent, with bases having metallic cations. Examples of suitable bases include, without limitation, metal oxides and metal hydroxides. The metallic ions may be monovalent, divalent, trivalent, multivalent, or mixtures of ions of different valencies. Preferably, the metallic ion is selected from the group consisting of sodium, lithium, magnesium, zinc, aluminum, and mixtures thereof. More preferably, the metallic ion is selected from the group consisting of sodium, zinc, and mixtures thereof. Sodium is preferred as the neutralizing metallic ion for polymer sheets having high optical clarity. Zinc is preferred as the neutralizing metallic ion for polymer sheets having high moisture resistance.

Suitable polymeric sheets have a thickness of about 10 mils (0.25 mm), 15 mils (0.38 mm), 30 mils (0.75 mm) or greater. When the polymeric sheet has a relatively high modulus, its preferred thickness may be about 50 mils (1.25 mm), 60 mils (1.50 mm), 90 mils (2.25 mm), or 120 mils (3.00 mm) or greater, based on enhanced penetration strength of the multilayer laminate articles. The enhanced penetration strength is necessary to satisfy many of the current mandated requirements for hurricane and threat resistance.

The polymeric sheets may further comprise additives such as plasticizers, processing aides, flow enhancing additives, lubricants, pigments, dyes, flame retardants, impact modifiers, nucleating agents to increase crystallinity, antiblocking agents such as silica, thermal stabilizers such as, but not limited to those disclosed in U.S. Pat. Nos. 4,325,863; 4,338,244; 5,175,312; 5,216,052; 5,252,643; 5,356,966; 5,367,008; 5,369,159; 5,428,162; 5,428,177; 5,488,117; 5,516,920; 5,607,624; 5,614,572; 5,693,829; 5,773,631; 5,814,692; 6,140,397; 6,521,681; 6,586,606; German Patent Nos. DE-A-4316611; DE-A-4316622; and DE-A-4316876; and European Patent Nos. EP-A-0589839 and EP-A-0591102; UV absorbers, UV stabilizers, dispersants, surfactants, chelating agents, coupling agents, adhesives, primers, and the like, and combinations of two or more of these additives.

A description of suitable polymeric films for use in the multilayer laminate articles is set forth at length in U.S. application Ser. No. 11/441,899 and Ser. No. 11/441,906, and in the provisional applications to which these applications claim priority.

Briefly, however, suitable polymeric films may be formed from any polymeric matrix material. Preferably, the polymeric film is a biaxially oriented poly(ethylene terephthalate) film, a cellulose acetate film or a polycarbonate film.

Preferably, one or both surfaces of the polymeric film may be treated to enhance the adhesion to the coating or to the polymeric sheet or both. This treatment may take any form known within the art, including adhesives, primers, such as silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof.

The difference between a polymeric film and a polymeric sheet is the thickness, but there is no set industry standard as to when a film becomes a sheet. As used herein, the term "film" refers to a substantially planar mass having a thickness of about 10 mils (0.25 mm) or less. Preferably, the polymeric film has a thickness of between about 0.5 mils (0.012 millimeters (mm)), to about 10 mils (0.25 mm). More preferably, the polymeric film used in the multilayer laminate has a thickness of about 1 mil (0.025mm) to about 5 mils (0.13 mm). The thickness of the polymeric sheets useful in the present invention has been described above.

It is understood that the polymeric films may include additives known within the art. Suitable additives are described above with respect to polymeric sheets and include plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and the like.

The rigid sheets useful in the laminates of the present invention may be glass or rigid transparent plastic sheets, such as, for example, polycarbonates, acrylics, polyacrylates, cyclic polyolefins, such as ethylene norbornene polymers, metallocene-catalyzed polystyrenes and the like and combinations thereof. Metal or ceramic plates may also be suitable, if transparency is not required for the laminate.

The term "glass" includes not only window glass, plate glass, silicate glass, sheet glass, and float glass, but also colored glass, specialty glass which includes ingredients to control, for example, solar heating, coated glass with, for example, sputtered metals, such as silver or indium tin oxide, for solar control purposes and other specialty glasses. The type of glass to be selected for a particular laminate depends on the intended use.

Half-wave plates can be made of any birefringent material with a thickness such that RHCPL is converted to LHCPL, and visa versa. Examples of suitable birefringent films and sheets include, without limitation, inorganic single crystals, stretched polymer films, or nematic liquid crystal films. Known and conventional processes can be used to prepare stretched polymer films and nematic liquid crystal films. Suitable half wave film can be obtained commercially. For example, a Wave Retarder Film can be obtained from International Polarizer, Inc., 320 Elm Street, Marlborough, Mass.; OptiGrafix™ Half Wave Optical Light Retarder Base Film can be obtained from Grafix™ Plastics, 19499 Miles Rd., Cleveland, Ohio; and Mica Waveplates are commercially available from Karl Lambrecht Corporation, 4204 N. Lincoln Ave., Chicago, Ill.

The multilayer laminate may comprise an absorptive layer. Suitable absorptive layers are described in detail in U.S. application Ser. Nos. 11/441,899 and 11/441,906, and in the provisional applications to which these applications claim priority.

Briefly, however, the absorptive layer of the multilayer laminate articles may be in the form of a discrete layer, such as a discrete polymeric film or a discrete polymeric sheet, for example. Alternatively, the absorptive layer may be in the form of a coating on one or more of the twisted nematic liquid crystal layers, the polymeric sheets, the polymeric films and the rigid sheets. In still other embodiments the absorptive layer may be incorporated into one or more of the twisted nematic liquid crystal layers, the polymeric sheets, the polymeric films and the rigid sheets.

The absorptive material used in the present invention may incorporate a colorant; a dye; a pigment; an inorganic infrared absorber; an organic infrared absorber; or a combination of two or more thereof. Infrared absorptive materials, as used herein, means absorptive materials having a local maximum in the absorption spectra between 780 nm and 2100 nm. The absorptive material may include as many absorptive components as needed to provide the spectral absorptive characteristics desired.

Nanoparticles of inorganic infrared absorptive material are particularly useful in forming the absorptive layer. Preferably, the inorganic infrared absorptive nanoparticles are selected from the group consisting of antimony doped tin oxide (ATO), tin-doped indium oxide (ITO), lanthanum hexaboride ($LaB_6$), and mixtures thereof.

Absorptive materials useful in the multilayer laminates of the present invention may also comprise organic infrared absorbents including, but are not limited to, polymethine dyes, amminium dyes, imminium dyes, dithiolene-type dyes and rylene-type, phthalocyanine-type, and naphthalocyanine-type dyes and pigments, and combinations thereof.

In the case that the absorptive material is not located in the same layer as the twisted nematic reflective material, it is preferred that the twisted nematic reflector be located in a layer that is outboard to the absorptive layer, that is, more toward the exterior of the building or structure in which the multilayer laminate of the invention is used. Thus, should the reflected and absorbed bands of radiation overlap, the overlapped band will be reflected rather than being absorbed. This leads to a decrease in the amount of energy that passes through the glazing because the glazing will not warm up as much as it would were the absorber is on the outboard side of the glazing.

Adhesives and primers may be used to enhance the bond strength between the laminate layers, if desired. For example, silane coupling agents may be applied to the films and sheets to enhance the adhesion between layers of the multilayer laminate. Likewise, adhesives or primers may be applied between the layer of nonmicellar twisted nematic liquid crystal and the substrate (e.g., to the rigid sheet, polymeric sheet or polymeric film) to which it is applied.

Examples of suitable adhesives and primers are described in detail in U.S. application Ser. Nos. 11/441,899 and 11/441,906, and in the provisional applications to which these applications claim priority. Specific examples of useful silane coupling agents are gamma-glycidoxypropyl trimethoxysilane, or gamma-aminopropyl triethoxysilane. Typically, silane coupling agents are added at a level of about 0.01 to about 5 weight percent based on the total weight of the film or sheet composition. An example of a preferred primer is polyallyl amine. Further examples of adhesives include epoxy and siloxane resins.

The use of some adhesives and primers can unexpectedly change the wavelength of peak reflection of the twisted nematic material. For instance, when some epoxy resin formulations are applied to the surface of the twisted nematic film and subsequently cured at elevated temperatures, the wavelength of peak reflection may move to longer wavelengths. In addition, some epoxy resins, when cured at room temperature resulting in no substantial change in the wavelength of peak reflection, can move to longer or shorter wavelengths in a subsequent heat treatment. Finally, because processing to form the finished laminates require elevated temperatures in order to sufficiently bond the materials to form stable laminates, some changes in the wavelength of peak reflection are sometimes seen as a result of this process as well. Shifts of 30 nm and even as large as 50 nm and 100 nm have been observed.

An example of an adhesive or primer that can cause a shift in the wavelength of peak reflection is HySol™ E-05CL two-part epoxy, available from the Henkel-Loctite Corporation of Rocky Hill, Conn. An example of an adhesive or primer that may cause minimal shift in the wavelength of peak reflection is RTV-108, a siloxane resin material from the General Electric Company of Fairfield, Conn.

The multilayer laminate may also include a hard coat layer. The hard coat is typically formed from an ultraviolet (UV) curing resin on one or both surfaces to protect the outer layer(s) from scratching, abrasion, and like insults. Any suitable hard coat formulation may be employed. One preferred hard coat is described in U.S. Pat. No. 4,027,073. The hard coat may incorporate further additives or be modified to provide other desirable attributes, such as a high scratch-resistance, for example, fine particles of $SiO_2$, $TiO_2$, $ZrO_2$, $Al_2O_3$ or MgO that do not substantially affect the transmission of visible light; antifog properties, for example hydrophilic monomers, oligomers or surfactants that can act as wetting agents; high gloss, for example ADEKA OPTMER™ KR-567 available from the Asahi Denka Kogyo K.K. Company; and moisture vapor barrier properties or resistance to polar solvents, for example, monomers, oligomers, or resins containing silicon or fluorine.

Suitable processes to produce the multilayer laminate articles described herein, including preferred process conditions, are set forth at length in U.S. application Ser. Nos. 11/441,899 and 11/441,906, and in the provisional applications to which these applications claim priority.

Briefly, however, one process to produce the multilayer laminate article in the form of a polymeric sheet laminated to a polymeric film coated with the twisted nematic liquid crystal layer is as follows. The polymeric sheet may be lightly bonded to the film with the twisted nematic liquid crystal through a nip roll bonding process. The film with the twisted nematic liquid crystal is fed along with the polymeric sheet through nip rolls where the two layers are merged together under moderate pressure to form a weakly bonded laminate. If desired, the nip rolls may be heated to promote the bonding process. The bonding pressure exerted by the nip rolls may vary with the film materials, the polymeric materials, and the temperatures employed. After bonding, the laminate is passed over a series of cooling rolls which ensure that the laminate taken up on a roll is not tacky. Process water cooling is generally sufficient to achieve this objective. Tension within the system may be further maintained through the use of idler rolls. Laminate articles made through this process will have sufficient strength to allow handling by laminators who may produce further laminate articles, such as glass laminates, which encapsulate this laminate.

The multilayer laminate article may also be formed by autoclave processes. In a typical conventional autoclave process, a glass sheet, an interlayer composed of a polymeric sheet, a polymeric film with the twisted nematic liquid crystal (either in the form of a coated layer or of a film), a second polymeric sheet, and a second glass sheet are laminated together under heat and pressure and a vacuum to remove air from between the layers of the laminate. Typically, the interlayer of the multilayer laminate, i.e. the polymeric sheet, the polymeric film with the twisted nematic liquid crystal, and the second polymeric sheet, is positioned between two glass plates to form a glass/interlayer/glass assembly. The laminated article at this stage is referred to as a "pre-press assembly." This pre-press assembly is placed into a bag capable of sustaining a vacuum. The air is drawn out of the vacuum bag, and the vacuum bag is sealed while maintaining the vacuum. The sealed bag is placed in an autoclave, generally at a temperature of about 130° C. to about 180° C., and at a pressure of about 200 psi (15 bars), for a time of from about 10 to about 50 minutes.

The multilayer laminate may also be a "window film" that is suitable for application to existing glazing. Such structures are described in U.S. Pat. No. 6,800,337, for example. In one common structure, the chiral nematic liquid crystalline layer is applied to a transparent substrate by any suitable method, such as those described above. The liquid crystalline layer may be cured if necessary or desirable, and additional layers (a second liquid crystalline layer, a hardcoat, e.g.) may be applied. The coated substrate is then adhered to existing glazing, for example by static electricity, by use of an adhesive, or by the propensity of the substrate to cling to the glazing.

As described above, the multilayer laminate articles may include additional layers, such as other polymeric sheets, other coated or uncoated polymeric films, half-wave plates and absorptive layer.

Some preferred multilayer laminate articles include those described in detail in U.S. application Ser. Nos. 11/441,899 and 11/441,906, and in the provisional applications to which these applications claim priority. Particularly preferred is a multilayer laminate comprising at least two layers of the nonmicellar twisted nematic liquid crystal having cholesteric infrared-reflecting properties, at least one of which is a layer of a nonmicellar right handed twisted nematic liquid crystal and at least one of which is a layer of a nonmicellar left handed twisted nematic liquid crystal. In one such laminate, there are equal numbers of nonmicellar right handed twisted nematic liquid crystal layers and nonmicellar left handed twisted nematic liquid crystal layers. In a laminate with equal numbers of right handed and left handed twisted nematic liquid crystal layers, for each nonmicellar right handed twisted nematic liquid crystal layer exhibiting reflection of light in a wavelength region of wavelength $\lambda_0$ there is a corresponding nonmicellar left handed twisted nematic liquid crystal layer exhibiting reflection of light at approximately the same wavelength region.

In another laminate, the at least one layer of the nonmicellar twisted nematic liquid crystal has a reflective bandwidth of greater than 100 nm, preferably greater than 120 nm and more preferably greater than 150 nm.

The multilayer laminate may further comprise at least one layer of a half-wave plate, wherein there is at least a first and a second layer of nonmicellar twisted nematic liquid crystals having identical handedness, and wherein at least one layer of a half-wave plate is positioned between the first and second layers of twisted nematic liquid crystals of identical handedness.

The multilayer laminate may further comprise n layers of half-wave plates, wherein n is an integer, wherein there are n pairs of layers of the nonmicellar twisted nematic liquid crystal, each layer of a pair having identical handedness and each layer of a pair exhibiting reflection of light in the same wavelength region, and wherein a half-wave plate for the same wavelength $\lambda_0$ is positioned between each pair of layers of the nonmicellar twisted nematic liquid crystal having identical handedness.

The multilayer laminate may further comprise at least one absorptive material or at least one absorptive layer. For example, the absorptive layer or absorptive material may be colored, or may be absorptive of infrared radiation. The multilayer laminate may have infrared absorptive inorganic nanoparticles contained within at least one layer of the nonmicellar twisted nematic liquid crystal.

The multilayer laminate may further comprise at least one layer of a polymeric film, at least one layer of rigid sheet, or both. A preferred laminate comprises two layers of a polymer sheet and two layers of a rigid sheet.

Preferably, the individual layers of the multilayer laminate articles transmit greater than 50% of visible light. More preferably, the multilayer laminate articles transmit greater than 50% of visible light.

In some multilayer laminates, the at least one layer of the nonmicellar twisted nematic liquid crystal may have a reflective bandwidth of greater than 100 nm. In other multilayer laminates, the compound of formula (i) is comprised by a polymer network having a wavelength of maximum reflection in the range of about 280 to about 2500 nm; and more preferably, in the range of about 700 to about 1400 nm.

Specific examples of preferred multilayer laminates include, e.g.,
polymeric film or sheet coated with nonmicellar twisted nematic liquid crystal (a "window film", e.g.);
glass/polymeric sheet coated with nonmicellar twisted nematic liquid crystal/optional hardcoat;
glass/polymeric sheet coated on one or both sides with nonmicellar twisted nematic liquid crystal/film/optional hardcoat;
glass/polymeric sheet coated on one or both sides with nonmicellar twisted nematic liquid crystal/glass;
glass/polymeric sheet/film coated on one or both sides with nonmicellar twisted nematic liquid crystal/polymeric sheet/glass; and
glass/polymeric sheet/film coated on one or both sides with nonmicellar twisted nematic liquid crystal/polymeric sheet/film coated on one or both sides with nonmicellar twisted nematic liquid crystal/polymeric sheet/glass.

In each of the above laminates, "/" indicates adjacent layers. Moreover, the second layer of any film or sheet may be the same as or different from the first layer of that film or sheet. Likewise, the third layer may be the same as or different from the first and second layers of that film or sheet, and so on. Furthermore, in some preferred laminates, the adjacent layers are directly laminated to each other so that they are adjoining or, more preferably, contiguous.

The following examples are provided to describe the invention in further detail. These examples, which set forth a preferred mode presently contemplated for carrying out the invention, are intended to illustrate and not to limit the invention.

EXAMPLES OF THE INVENTION

Standard Alignment Layer Application Procedure

Glass plates are cleaned by placing them in a beaker with a solution of water and Micro-90 cleaning solution in a sonic bath. After sonication they are rinsed with deionized water and dried with a towel.

Pyralin™ P12555 (4 gm) are mixed with 12 gm of solvent thinner T9039 (both from HD Microsystems of Parlin, N.J.). A Headway Research PWM32 Spin Coater is used to coat the glass substrates with the polyimide solution. The glass plates are rinsed with isopropyl alcohol and spun until dryness prior to applying the polyimide solution. Polyimide solution is applied and spun according to the following program: 500 RPM for 5 sec, then 2000 RPM for 5 sec, then 5000 RPM for 30 sec. The plates are then put on a hot plate at 120° C. for 1 min., followed by a second hot plate at 150° C. for 1 min to soft bake the polyimide. The polyimide is finally cured by placing the coated substrates in aluminum pans and heating them in air in a box furnace. The furnace is programmed to ramp from room temperature to 200° C. at 5° C./min., then hold at 200° C. for 30 min., then cool. Following this treatment, the box furnace is purged with nitrogen at a flow rate of 10 slpm, and the furnace is heated using the following program: room temperature (RT) to 200° C. at 4° C./min., hold at 200° C. for 30 min., then ramp from 200° C. to 300° C. at 2.5° C./min., then hold at 300° C. for 60 min. The glass plates are allowed cool in the oven for 2 hours 10 minutes to 88° C. and then are removed from the oven.

Standard Substrate-Rubbing Procedure

A rubbing process is used both directly on the poly(ethylene terephthalate) films and on the glass plates after the application of the alignment layer and before the application of the coating solution in order to ensure the formation of a planar texture. Each substrate is rubbed 20 times in the same direction using Rubbing Cloth YA-25-C available from the Yoshikawa Kako K.K. mounted on a 2.75" by 5.5" inch block under moderate hand pressure.

Standard Lamination Procedure

A pre-press assembly, in which all the layers in the laminate are cut to the same size and stacked in the desired order, is placed into a vacuum bag and heated at 90 to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas, so that the pressure in the autoclave is allowed to decrease. After 20 minutes of cooling, when the air temperature is less than about 50° C., the excess pressure is vented, and the laminate is removed from the autoclave.

Compounds used in Examples

Preparative Example PE1

A twisted nematic liquid crystal (TNLC) mixture was prepared by using compounds with structures A, B, C and D (shown above) and Irgacure™ 184 photoinitiator (available from Ciba of Tarrytown, N.Y.). Amounts of the ingredients shown in the table below were combined in methylene chloride (5 mL), stirred at room temperature for 10 min and subsequently filtered through a 0.45 micron syringe filter into an amber vial. The methylene chloride was removed under reduced pressure to provide the TNLC mixture (0.34 g). A coating solution for making a nonmicellar TNLC layer was prepared by dissolving the TNLC mixture (0.34 g) into xylenes (0.66 mL) under mild heating and stirring. The solution was cooled to room temperature (RT) before coating.

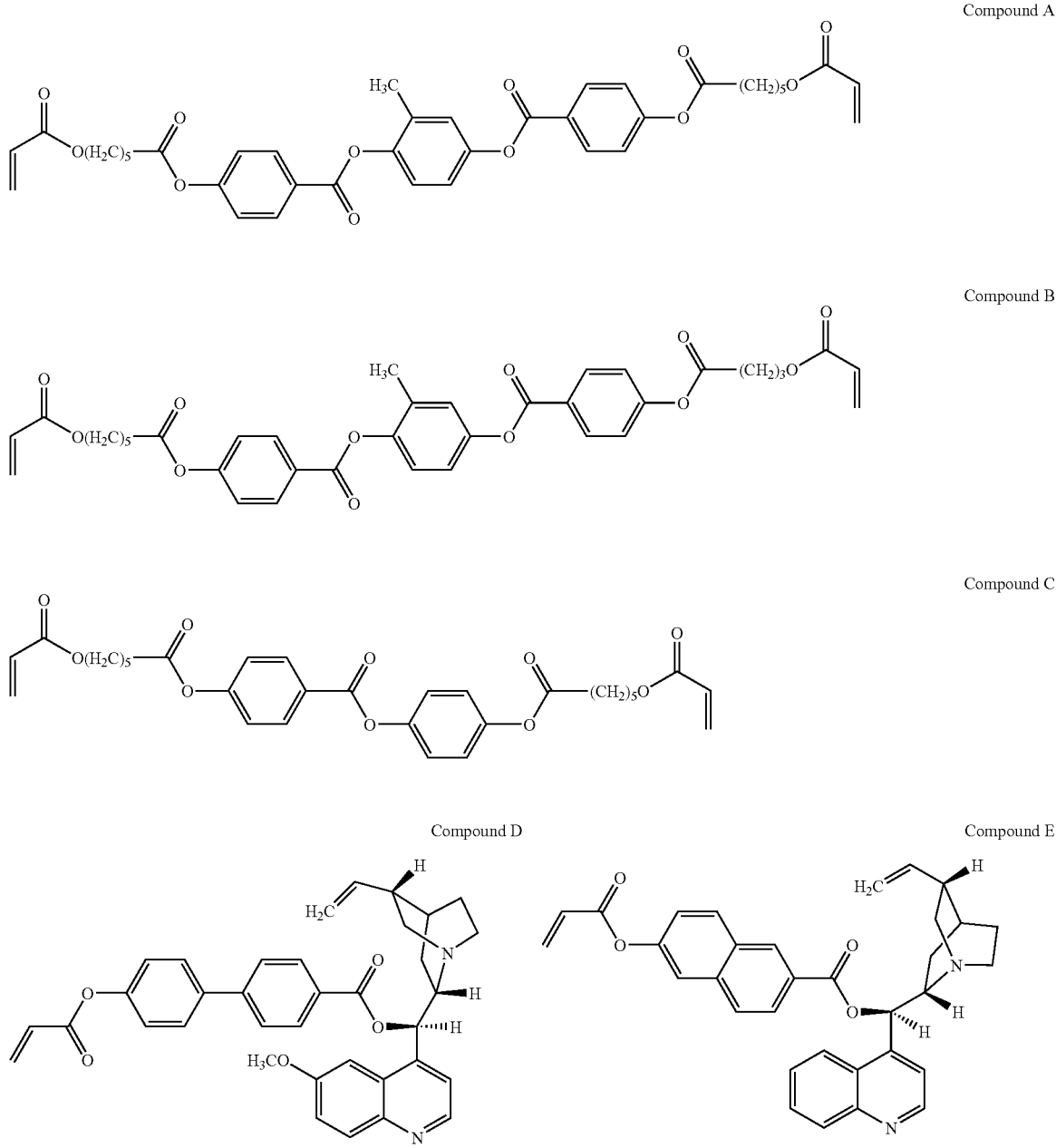

| Compound | Weight |
| --- | --- |
| A | 0.157 g |
| B | 0.078 g |
| C | 0.059 g |
| D | 0.037 g |
| Irgacure™ 184 | 0.006 g |

Preparative Example PE2

A nonmicellar TNLC layer was coated onto the rubbed Melinex™ 200M film using the solution prepared in PE2. (Melinex™ films are available from DuPont Teijin Films of Hopewell, Va.) The Melinex™ film, still attached to the glass plate after the rubbing step, was affixed to the glass using tape. About 0.25 mL of coating solution was applied to the Melinex™ film. The coating solution was spread on the film by hand using a wire wound coating rod (#012, R. D. Specialties) Immediately after coating, the Melinex® film was transferred to a hotplate and dried at 60° C. for 5 min. The coated Melinex™ film was then transferred to a room temperature tabletop and covered with a 4¾"×4¾"×1⅞" quartz box, equipped with a nitrogen purge at a rate of 2.5 L/min. After purging for 5 min, the sample was cured by irradiation from a longwave ultraviolet light lamp (Blak-Ray Model B 100, Mineralogical Research Company, San Jose, Calif.) for 5 min. A Varian Cary 5000 UV/Vis/IR spectrometer was used to measure the reflectance. The maximum reflectance of the cured film occurred at a wavelength λ of about 625 nm.

Preparative Example PE3

A 2.5×3.5 inch piece of the TNLC layer produced in PE2 and a section of 3×4 inch 460 gauge Melinex™ 535 primed PET film were taped together along one edge, forming a hinge. The coated surface of the TNLC layer was placed towards the Melinex™ 535 primed layer. Roughly 3.5 g of a UV cured acrylate adhesive (Locktite™ 349) was applied as a bead between the films at the hinged end, and the hinged pieces were placed in a Ziplok™ polyethylene bag. This assembly was processed through a rubber-roll laminator (GBC 3500 Pro Series Laminator, GBC, Addison Ill.) on speed 2 to uniformly spread the adhesive between the coated surface and the Melinex™ 535. The hinge end of the assembly entered the nip prior to the rest of the assembly. The assembly was then cured using a longwave ultraviolet light lamp (Blak-Ray Model B 100, Mineralogical Research Company, San Jose, Calif.) for 5 min while in a quartz box being purged with nitrogen at 2.5 L/min. The polyethylene bag was removed, leaving the liquid crystal stack, i.e., Melinex™ 200M/TNLC polymer layer/adhesive/Melinex™ 535. The layer of Melinex™ 200M was removed leaving the liquid crystal film adhered to the Melinex™ 535. The resulting liquid crystal-coated Melinex™ 535 was then cut into rectangles measuring 2×3 inches in lateral dimensions.

Preparative Example PE4

A TNLC mixture was prepared by using compounds with structures A, B, C and E (shown above) and Irgacure™ 184 photoinitiator following the same procedure described in PE1. Amounts of the ingredients are shown in the table below. A coating solution for making a nonmicellar TNLC layer was prepared by dissolving the TNLC mixture (0.34 g) into xylenes (0.66 mL) under mild heating and stirring. The solution was cooled to RT before coating.

| Compound | Weight |
| --- | --- |
| A | 0.157 g |
| B | 0.078 g |
| C | 0.059 g |
| E | 0.037 g |
| Irgacure™ 184 | 0.006 g |

Preparative Example PE5

A nonmicellar TNLC layer was coated onto the rubbed Melinex™ 200M film using the solution prepared in PE4 following the procedure described in PE2. The maximum reflectance of the cured film occurred at a wavelength λ of about 1050 nm.

Preparative Example PE6

A liquid crystal stack containing TNLC polymer layer prepared in PE5, i.e., Melinex™ 200M/TNLC polymer layer/adhesive/Melinex™ 535, was prepared following the same procedure described in PE3. The layer of Melinex™ 200M was removed leaving the liquid crystal film adhered to the Melinex™ 535. The resulting liquid crystal-coated Melinex™ 535 was then cut into rectangles measuring 2×3 inches in lateral dimensions.

Example 1

Laminates comprising the liquid crystal stack were prepared by layering these materials in the following order (all components were 2×3 inches in lateral dimensions): a 1 mm borosilicate glass sheet, a 30 mil thick clear SentryGlas® Plus ionomeric interlayer sheet (available from DuPont), the liquid crystal-coated Melinex™ 535 sheet from PE6, an additional 30 mil thick clear SentryGlas® Plus sheet, and an additional 1 mm borosilicate glass sheet. This assembly was taped at the corners to prevent movement during lamination. The resulting taped assembly was put on a ⅛th inch thick silicone rubber sheet, covered by another ⅛th inch thick silicone rubber sheet. The laminates were pressed using an OEM model #1553 vacuum hot press. On the lower platen was placed a 1/16th inch thick stainless steel sheet. The rubber-encapsulated sample was placed on the stainless steel sheet, and covered by an identical stainless steel sheet. The door to the press was closed, and the platens of the press were heated to 105° C. The press was evacuated for 3 min. The bottom platen was subsequently raised until the top stainless steel sheet almost touched the top platen. The press was held at this condition for 7 min. The bottom platen of the press was then brought into contact with the top platen with minimal pressure (69 on the gauge) and was held for 10 min. The pressure was then released, the heating was turned off, and the vacuum was released. The door to the press was opened and the samples were removed. The maximum reflection wavelength, λ, of the laminates was unchanged at about 1020 nm.

Example 2

Two laminates comprising the liquid crystal stack was prepared by layering these materials in the following order (all components were 2×3 inches in lateral dimension): a 1 mm borosilicate glass sheet, a 30 mil thick clear Butacite® sheet, the liquid crystal-coated Melinex™ 535 sheet from PE3, an additional 30 mil thick clear Butacite® polyvinyl butyral interlayer sheet (available from DuPont), and an additional 1 mm borosilicate glass sheet. This assembly was taped at the corners to prevent movement during lamination. The resulting taped assembly was put on a ⅛th inch thick silicone rubber sheet, covered by another ⅛th inch thick silicone rubber sheet. The laminates were pressed using an OEM model #1553 vacuum hot press. On the lower platen was placed a ¹⁄₁₆th inch thick stainless steel sheet. The rubber-encapsulated sample was placed on the stainless steel sheet, and covered by an identical stainless steel sheet. The door to the press was closed, and the platens of the press were heated to 120° C. The press was evacuated for 3 min. The bottom platen was subsequently raised until the top stainless steel sheet almost touched the top platen. The press was held at this condition for 7 min. The bottom platen was then brought into contact with the top platen with minimal pressure (62 on the gauge) and was held for 10 min. The pressure was then released, the heating was turned off, and the vacuum was released. The door to the press was opened and the samples were removed. The maximum reflection wavelength, λ, of the laminates was unchanged at about 613 nm.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A multilayer laminate article for reflecting radiation having a wavelength in the range of 280 to 2500 nm, said article comprising:
   (a) at least one layer comprising a nonmicellar twisted nematic liquid crystal having cholesteric infrared-reflecting properties; and
   (b) at least one layer comprising a polymeric sheet;
   wherein, optionally, said at least one layer of said nonmicellar twisted nematic liquid crystal is in contact with said at least one layer of said polymer sheet;
   said nonmicellar twisted nematic liquid crystal comprising a compound of formula (I):

wherein
   D is a chiral moiety (D1) or (D2) derived, by formal removal of a hydroxyl group, from the alkaloids selected from the group consisting of (−)-cinchonidine, CAS [485-71-2]; (+)-cinchonine, CAS [118-10-5]; quinine, CAS [130-95-0] and quinidine, CAS [56-54-2]; and their dihydro-derivatives:

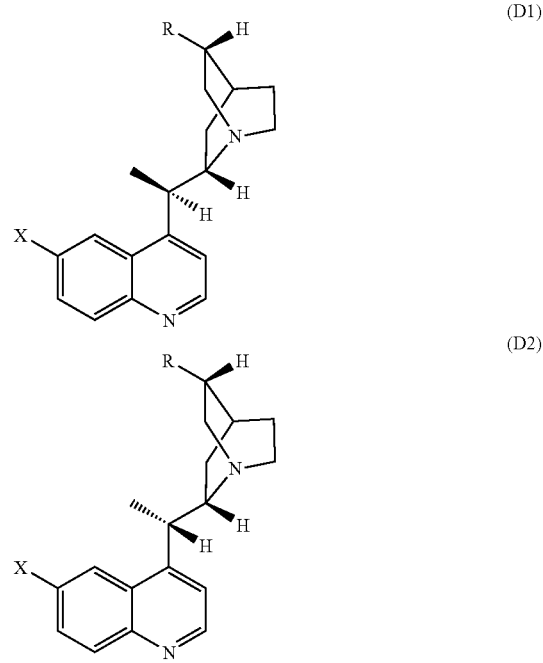

X is hydrogen or —OCH$_3$;
R is —CH=CH$_2$ or —CH$_2$CH$_3$;
S$_1$ is a linking group selected from the group consisting of —O—, —OC(O)—, —OC(O)NH— and —OC(O)O—;
S$_2$ and S$_3$ are linking groups each independently selected from the group consisting of covalent bond, —O—, —S—, —C(O)—, —OC(O)—, —C(O)O—, —OC(O)O—, —OC(O)NR$_1$—, —NR$_1$C(O)O—, —SC(O)—, and —C(O)S—;
R$_1$ is hydrogen or C$_1$ to C$_4$ alkyl;
each B is a divalent radical independently selected from the group consisting of aliphatic and aromatic carbocyclic and heterocyclic groups having 1 to 16 carbon atoms; optionally having one or more fused rings and optionally mono- or polysubstituted with L;
L is selected from the group consisting of the substituents F, Cl, —CN, and —NO$_2$; and alkyl, alkoxy, alkylcarbonyl, and alkoxycarbonyl groups, having 1 to 8 carbon atoms, wherein one or more of the carbon atoms are optionally substituted with F or Cl;
A$_1$ is a divalent linear or branched alkyl having 2 to 20 carbon atoms, optionally interrupted by linking groups selected from the group —O—, —S—, —C(O)—, —OC(O)— and —C(O)O—;
R$_p$ is a polymerizable group;
m is an integer of 1 or 2; and
n is an integer of 0 or 1.

2. The multilayer laminate article of claim 1, wherein the polymeric sheet comprises polyvinyl butyral, poly(ethylene-co-vinyl acetate) or an ethylene acid copolymer or ionomer thereof.

3. The multilayer laminate article of claim 1, further comprising at least one layer of a polymeric film.

4. The multilayer laminate article of claim 3, wherein the polymeric film is a biaxially oriented poly(ethylene terephthalate) film, a cellulose acetate film or a polycarbonate film.

5. The multilayer laminate article of claim 3, wherein at least one surface of at least one layer of the nonmicellar twisted nematic liquid crystal is in contact with at least one surface of at least one layer of the polymeric film.

6. The multilayer laminate article of claim 1, further comprising at least one layer of a rigid sheet comprising glass, polycarbonate, polyacrylate, a cyclic polyolefin, a cyclic polyolefin ethylene norbornene polymer, metallocene-catalyzed polystyrene or a combination thereof.

7. The multilayer laminate article of claim 6, wherein at least one surface of at least one layer of the nonmicellar twisted nematic liquid crystal is in contact with at least one surface of at least one layer of the rigid sheet.

8. The multilayer laminate article of claim 6, comprising two layers of polymeric sheet and two layers of rigid sheet.

9. The multilayer laminate article of claim 8, further comprising at least one layer of a polymeric film.

10. The multilayer laminate article of claim 1, further comprising an adhesive or primer on at least one surface of at least one layer of the nonmicellar twisted nematic liquid crystal.

11. The multilayer laminate article of claim 10, wherein the adhesive or primer comprises gamma-glycidoxypropyltrimethoxysilane, gamma-aminopropyltriethoxysilane, an epoxy resin, a siloxane resin or polyallyl amine.

12. The multilayer laminate article of claim 10, wherein the adhesive results in a shift in the wavelength of peak reflection of the nonmicellar twisted nematic liquid crystal of greater than 30 nm.

13. The multilayer laminate article of claim 1, wherein there are at least two layers of the nonmicellar twisted nematic liquid crystal having cholesteric infrared-reflecting properties, at least one of which is a layer of a nonmicellar right handed twisted nematic liquid crystal and at least one of which is a layer of a nonmicellar left handed twisted nematic liquid crystal comprising the compound of formula (I).

14. The multilayer laminate article of claim 13, wherein for each nonmicellar right handed twisted nematic liquid crystal layer exhibiting reflection of light at wavelength $\lambda_0$ there is a corresponding nonmicellar left handed twisted nematic liquid crystal exhibiting reflection of light at approximately the same wavelength.

15. The multilayer laminate article of claim 1, further comprising n layers of half-wave plates, wherein n is an integer, wherein there are n pairs of layers of the nonmicellar twisted nematic liquid crystal, each layer of a pair having identical handedness and each layer of a pair exhibiting reflection of light around the same wavelength $\lambda_0$, and wherein a half-wave plate for the same wavelength $\lambda_0$ is positioned between each pair of layers of the nonmicellar twisted nematic liquid crystal having identical handedness.

16. The multilayer laminate article of claim 1, further comprising at least one absorptive layer.

17. The multilayer laminate article of claim 16, wherein the absorptive layer is a discrete layer.

18. The multilayer laminate article of claim 16, wherein the absorptive layer is a coating on one or more of the layers of the multilayer laminate article.

19. The multilayer laminate article of claim 16, wherein the absorptive layer is incorporated into at least one or more of the layers of the multilayer laminate article.

20. The multilayer laminate article of claim 16, wherein the absorptive layer is an infrared absorptive layer.

21. The multilayer laminate article of claim 16, wherein the absorptive layer comprises infrared absorptive inorganic nanoparticles selected from the group consisting of antimony-doped tin oxide, tin-doped indium oxide, lanthanum hexaboride and mixtures thereof.

22. The multilayer laminate article of claim 1, wherein the nonmicellar twisted nematic liquid crystal is comprised by a polymer network.

23. The multilayer laminate article of claim 22 that reflects LHCPL (left-hand circularly polarized light) with a wavelength of maximum reflection in the range of about 280 to about 2500 nm.

24. The multilayer laminate article of claim 22 that reflects RHCPL (right-hand circularly polarized light) with a wavelength of maximum reflection in the range of about 280 to about 2500 nm.

25. The multilayer laminate article of claim 22 having a wavelength of maximum reflection in the range of 700 to about 1400 nm.

26. The multilayer laminate article of claim 1 wherein, in formula (I), —$R_p$ is selected from the group consisting of $CH_2$=$C(R_2)$—, glycidyl ether, propenyl ether, oxetane, and 1,2-, 1,3-, and 1,4-substituted styryl and alkyl substituted styryl radicals, wherein $R_2$ is hydrogen, Cl, F, or $CH_3$.

27. The multilayer laminate article of claim 1 wherein, in formula (I), n=0 or n=1, the radical —$S_2$—$R_p$ is $CH_2$=$C(R_2)$—$C(O)$—$O$—, and $R_2$ is hydrogen or —$CH_3$.

28. The multilayer laminate article of claim 1 wherein, in formula (I), $S_1$ is —O— or —OC(O)—, or wherein both $S_1$ and $S_2$ are —OC(O)—.

29. The multilayer laminate article of claim 1 wherein, in formula (I), B are divalent radicals independently selected from the group consisting of 1,4-cyclohexyl; 2,6-naphthyl; 4,4'-biphenyl; and $R_{11}$-substituted-1,4-phenyl, wherein $R_{11}$ is H, —$CH_3$ or —$OCH_3$.

30. The multilayer laminate article of claim 1 wherein formula (I) is selected from the group consisting of formulae (IIa), (IIb), (IIc), (IId), (IIIa) and (IIIb):

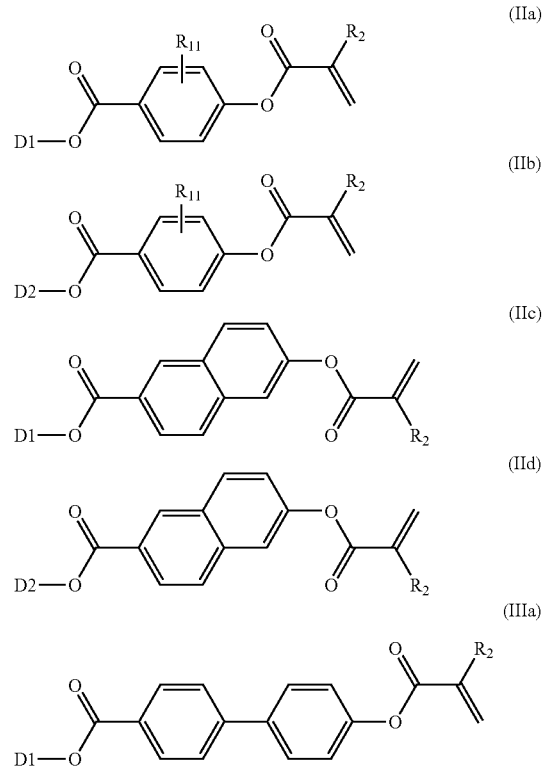

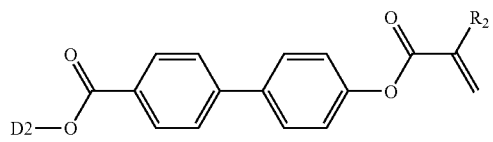
(IIIb)
wherein $R_{11}$ is H, —$CH_3$ or —$OCH_3$; and $R_2$ is hydrogen, Cl, F, or $CH_3$;
or wherein formula (I) is formula (IVa) or (IVb):
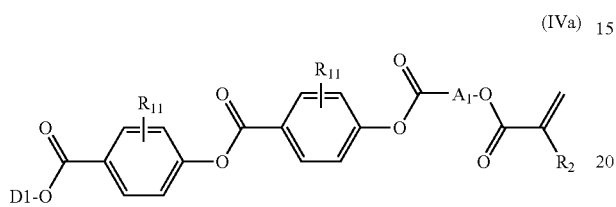
(IVa)
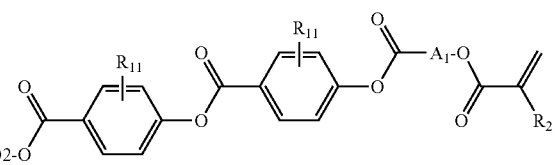
(IVb)
wherein $R_{11}$ is H, —$CH_3$ or —$OCH_3$; and $A_1$ is a divalent linear or branched alkyl having 3 to 20 carbon atoms, optionally interrupted by linking groups selected from the group —O—, —S—, —C(O)—, —OC(O)— and —C(O)O—; and $R_2$ is hydrogen, Cl, F, or $CH_3$.
\* \* \* \* \*